United States Patent
Ohtake

(10) Patent No.: US 10,224,730 B2
(45) Date of Patent: Mar. 5, 2019

(54) CAPACITOR DISCHARGE CIRCUIT

(71) Applicant: SANKEN ELECTRIC CO., LTD., Niiza-Shi, Saitama (JP)

(72) Inventor: Osamu Ohtake, Saitama (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 92 days.

(21) Appl. No.: 15/602,835

(22) Filed: May 23, 2017

(65) Prior Publication Data
US 2017/0346325 A1 Nov. 30, 2017

(30) Foreign Application Priority Data
May 24, 2016 (JP) .................................. 2016-103364

(51) Int. Cl.
| | |
|---|---|
| *H02J 1/10* | (2006.01) |
| *H02J 3/38* | (2006.01) |
| *H02J 7/34* | (2006.01) |
| *H02J 7/00* | (2006.01) |
| *H02M 1/08* | (2006.01) |
| *H02M 7/06* | (2006.01) |

(52) U.S. Cl.
CPC ............. *H02J 7/0063* (2013.01); *H02M 1/08* (2013.01); *H02M 7/06* (2013.01); *H02J 7/345* (2013.01)

(58) Field of Classification Search
CPC ............ H02M 7/06; H02M 7/08; H02M 7/12; H02M 7/217; H02M 7/00; H02M 1/08; H02M 1/14; H02M 1/32; H02J 7/345; H02J 7/0063

USPC ................. 307/109, 110, 108; 320/166, 167; 315/88, 89; 363/126, 128
See application file for complete search history.

(56) References Cited

U.S. PATENT DOCUMENTS

| | | | |
|---|---|---|---|
| 9,246,402 B2* | 1/2016 | Sakurai ................. | H02M 7/217 |
| 2015/0028758 A1* | 1/2015 | Diesing ................ | H02M 7/066 315/200 R |
| 2015/0062974 A1* | 3/2015 | Lund .................... | G01R 19/175 363/21.04 |
| 2016/0241135 A1* | 8/2016 | Zhao ...................... | H02M 1/44 |
| 2016/0268919 A1* | 9/2016 | Halberstadt ............ | H02M 1/42 |

FOREIGN PATENT DOCUMENTS

JP 4446136 B2 4/2010

* cited by examiner

*Primary Examiner* — Fritz M Fleming
*Assistant Examiner* — Jagdeep Dhillon
(74) *Attorney, Agent, or Firm* — Metrolexis Law Group, PLLC

(57) ABSTRACT

A capacitor discharge circuit according to one or more embodiments includes a capacitor connected in parallel to an alternating-current power source; a rectification element; a first discharge circuit that includes a first diode and a second diode, and causes the capacitor to discharge; a first series circuit including a first capacitor and a second capacitor connected in series between one end of the alternating-current power source and a ground terminal of the rectification element; a second discharge circuit that causes the second capacitor to discharge such that an absolute value of voltage across opposite ends of the second capacitor does not reach a predetermined voltage; and a predetermined period generator that actuates the first discharge circuit after an elapse of a predetermined period of time from stoppage of a discharge operation of the second discharge circuit.

7 Claims, 7 Drawing Sheets

US 10,224,730 B2

CAPACITOR DISCHARGE CIRCUIT

CROSS REFERENCE TO RELATED APPLICATIONS

This application claims priority based on 35 USC 119 from prior Japanese Patent Application No. 2016-103364 filed on May 24, 2016, entitled "CAPACITOR DISCHARGE CIRCUIT", the entire contents of which are incorporated herein by reference.

BACKGROUND

This disclosure relates to a capacitor discharge circuit for discharging charges accumulated in a capacitor connected between alternating-current power lines.

Power supply circuits for electric devices of related art, a capacitor called an across-the-line-capacitor (hereinafter abbreviated as "X capacitor"), which suppresses unnecessary radiation, is provided between the opposite ends of an alternating-current power source. A capacitor discharge circuit described in Japanese Patent No. 4446136 has been known as a conventional capacitor discharge circuit including an X capacitor.

This capacitor discharge circuit includes: an X capacitor connected between alternating-current power lines; and a series circuit including a first capacitor and a second capacitor that are connected between the alternating-current power lines and detect the voltage of an alternating-current power source. To this series circuit are connected a first time-constant circuit including a third capacitor, a first resistor, and a second resistor, and a second time-constant circuit including a fourth capacitor, a third resistor, and a fourth resistor. The time constant of the first time-constant circuit is set to be less than the time constant of the second time-constant circuit. Accordingly, the charges of the third capacitor are discharged more quickly than the charges of the fourth capacitor.

A transistor is connected to the outputs of the first time-constant circuit and the second time-constant circuit. A series circuit including a discharge resistor, a first switch, and a second switch is connected between the opposite ends of the X capacitor. The collector of the transistor is connected to the gates of the first switch and the second switch, and the emitter of the transistor is connected to the node between the first switch and the second switch.

Here, when the plug is pulled out from a commercial power source, the charges of the third capacitor are discharged through the first resistor and the second resistor and the transistor is turned off, but the charges of the fourth capacitor remain. Then, by the charges remaining in the fourth capacitor, the voltage of fourth capacitor is applied to the gates of the first switch and the second switch.

Thus, the first switch and the second switch are turned on, and the charges of the X capacitor are discharged through the discharge resistor. As a result, there is no potential difference between the input terminals of the power supply circuit. Hence, the user can be prevented from getting an electric shock by touching the plug.

Meanwhile, alternating-current voltage detection is performed to discharge the charges remaining in the X capacitor when the commercial power source is turned off. The alternating-current voltage detection is generally performed by dividing the voltage of the commercial power source by using resistors.

SUMMARY

A capacitor discharge circuit according to one or more embodiments includes a capacitor connected in parallel to an alternating-current power source; a rectification element that performs full-wave rectification on an alternating-current voltage from the alternating-current power source and supplies a rectified output to a load; a first discharge circuit that includes a first diode with an anode thereof connected to one end of the capacitor and a second diode with an anode thereof connected to another end of the capacitor, and causes the capacitor to discharge between cathodes of the first and second diodes and a ground terminal of the rectification element, the cathodes of the first and second diodes being connected to each other; a first series circuit including a first capacitor and a second capacitor connected in series between one end of the alternating-current power source and the ground terminal of the rectification element; a second discharge circuit that causes the second capacitor to discharge such that an absolute value of voltage across opposite ends of the second capacitor, which is connected to the ground terminal side of the rectification element, does not reach a predetermined voltage; and a predetermined period generator that actuates the first discharge circuit after an elapse of a predetermined period of time from stoppage of a discharge operation of the second discharge circuit.

A capacitor discharge circuit according to one or more embodiments includes an X capacitor connected to an alternating-current power source in parallel; a rectification element that performs full-wave rectification on an alternating-current voltage from the alternating-current power source and supplies a rectified output to a load; a first discharge circuit including: a first diode with an anode thereof connected to one end of the X capacitor; a second diode with an anode thereof connected to another end of the X capacitor, cathodes of the first and second diodes being connected to each other; a discharge resistor; and a first switching element, the discharge resistor and the first switching element being connected in series between the cathodes of the first and second diodes and the other end of the X capacitor, a first series circuit including a first capacitor and a second capacitor connected in series between one end of the alternating-current power source and a ground terminal of the rectification element; a second discharge circuit that includes a second switching element connected to the second capacitor in parallel and a reference power source having a predetermined voltage, and turns on the second switching element when an absolute value of voltage across opposite ends of the second capacitor is not equal to the predetermined voltage of the reference power source; and an activation circuit that has a timer and turns on the first switching element when a period of time during which the absolute value of voltage across opposite ends of the second capacitor is equal to the predetermined voltage of the reference power source is longer than a predetermined period.

DETAILED DESCRIPTION

Figure 1:
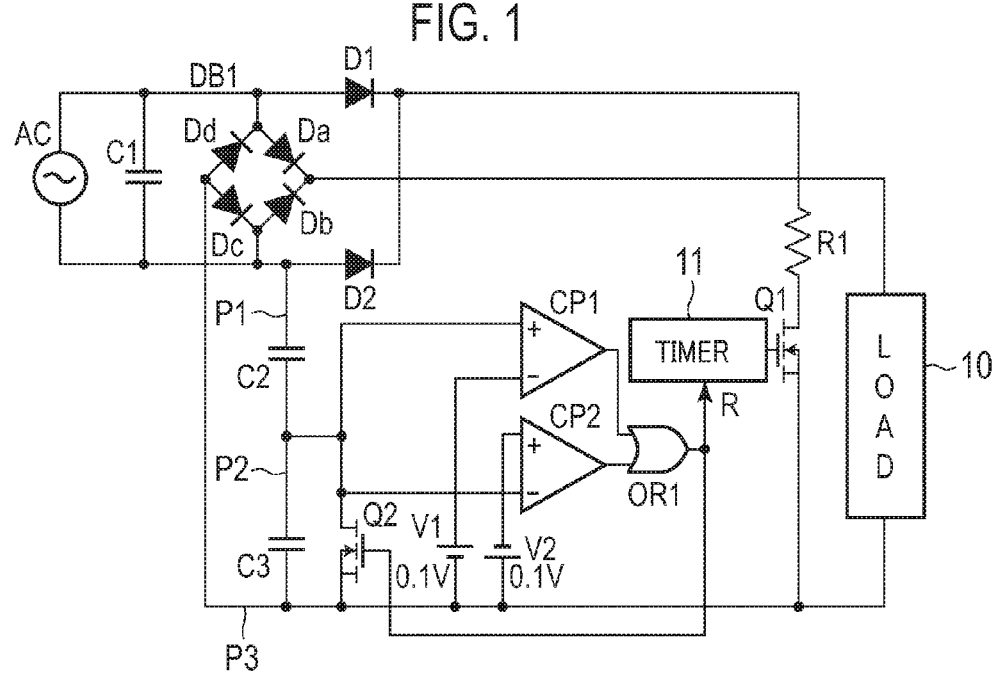
FIG. 1 is a diagram illustrating the circuit configuration of a capacitor discharge circuit according to one or more embodiments.

Capacitor discharge circuits according to embodiments of the invention are described below in detail with reference to the drawings.

In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

Embodiment 1

FIG. 1 is a diagram illustrating the circuit configuration of a capacitor discharge circuit according to one or more embodiments. In FIG. 1, the capacitor discharge circuit includes alternating-current power source AC, capacitors C1, C2, and C3, diodes D1, D2, and Da to Dd, switching elements Q1 and Q2, resistor R1, reference power sources V1 and V2, comparators CP1 and CP2, OR circuit OR1, and timer 11. Switching elements Q1 and Q2 each include an N-type MOSFET. Switching element Q1 corresponds to a first switching element. Switching element Q2 corresponds to a second switching element.

Capacitor C1, which is an X capacitor, is connected to the opposite ends of alternating-current power source AC, which generates alternating-current voltage. Diode bridge circuit DB1 is connected to the opposite ends of capacitor C1. Diode bridge circuit DB1 corresponds to a rectification element and includes four bridge-connected diodes Da to Dd.

The cathode of diode Dd and the anode of diode Da are connected to one end of capacitor C1. The cathode of diode Dc and the anode of diode Db are connected to the other end of capacitor C1. The anode of diode Dd is connected to the anode of diode Dc, and the cathode of diode Da is connected to the cathode of diode Db.

The anode of diode D1 (corresponding to a first diode) is connected to the one end of capacitor C1, and the cathode of diode D1 is connected to one end of resistor R1. The anode of diode D2 (corresponding to a second diode) is connected to the other end of capacitor C1, and the cathode of diode D2 is connected to the one end of resistor R1 and the cathode of diode D1.

Diode D1, diode D2, resistor R1, and switching element Q1 correspond to a first discharge circuit. The first discharge circuit causes capacitor C1 to discharge between diodes D1 and D2 and the ground terminal of diode bridge circuit DB1 (the anode terminal of diode Dc).

The cathode of diode Da and the cathode of diode Db are connected to one end of load 10, and the anode of diode Dd and the anode of diode Dc are connected to the other end of load 10.

Capacitor C2 (corresponding to a first capacitor) and capacitor C3 (corresponding to a second capacitor) are connected in series to one end of alternating-current power source AC and the ground terminal of diode bridge circuit DB1 (the anode terminal of diode Dc).

One end of capacitor C2 is connected to the other end of capacitor C1, and the other end of capacitor C2 is connected to one end of capacitor C3, the drain of switching element Q2, the non-inverting input terminal (+) of comparator CP1, and the inverting input terminal (−) of comparator CP2.

The other end of capacitor C3 is connected to the anode of diode Dd, the anode of diode Dc, the source of switching element Q2, the negative electrode of reference power source V1, the positive electrode of reference power source V2, the source of switching element Q1, and the other end of load 10.

The non-inverting input terminal of comparator CP1 is connected to the node between capacitor C2 and capacitor C3, and the inverting input terminal is connected to the positive electrode of reference power source V1. Reference power source V1 is a direct-current voltage of 0.1 V, for example. The output terminal of comparator CP1 is connected to an input terminal of OR circuit OR1.

Comparator CP2 has its inverting input terminal connected to the node between capacitor C2 and capacitor C3, and has its non-inverting input terminal connected to the negative terminal of reference power source V2. Reference power source V2 is a direct-current voltage of 0.1 V, for example. The output terminal of comparator CP2 is connected to another input terminal of OR circuit OR1. The output terminal of OR circuit OR1 is connected to the gate of switching element Q2 and reset terminal R of timer 11.

Comparator CP1, comparator CP2, reference power source V1, reference power source V2, OR circuit OR1, and switching element Q2 correspond to a second discharge circuit. The second discharge circuit causes capacitor C3 to discharge such that the absolute value of the voltage across the opposite ends of capacitor C3 does not reach or exceed a predetermined voltage, e.g. 0.1 V.

Timer 11 corresponds to a predetermined period generator. Timer 11 turns on switching element Q1, which is a part of the first discharge circuit, after the elapse of a predetermined period of time from stoppage of a discharge operation of capacitor C3. In other words, the predetermined period generator is an activation circuit that turns on switching element Q1 by using a timer.

Specifically, upon input of an L level from OR circuit OR1, timer 11 raises timer internal voltage. Then, when the timer internal voltage reaches a timer threshold, that is, when the predetermined period of time elapses from stoppage of a discharge operation of capacitor C3, timer 11 determines that the input from alternating-current power source AC has been disconnected, and outputs an ON signal to switching element Q1. Switching element Q1 is turned on by the ON signal from timer 11.

Note that the predetermined period of time is longer than a half cycle of alternating-current power source AC. More specifically, in FIG. 4, the period from time t4 to time t5 is equal to a half cycle of alternating-current power source AC, and the period from time t6 to time t7, which is equal to the predetermined period of time, is longer than a half cycle of alternating-current power source AC.

Next, the operation of this capacitor discharge circuit 1 is described in detail with reference to some drawings.

Figure 2:
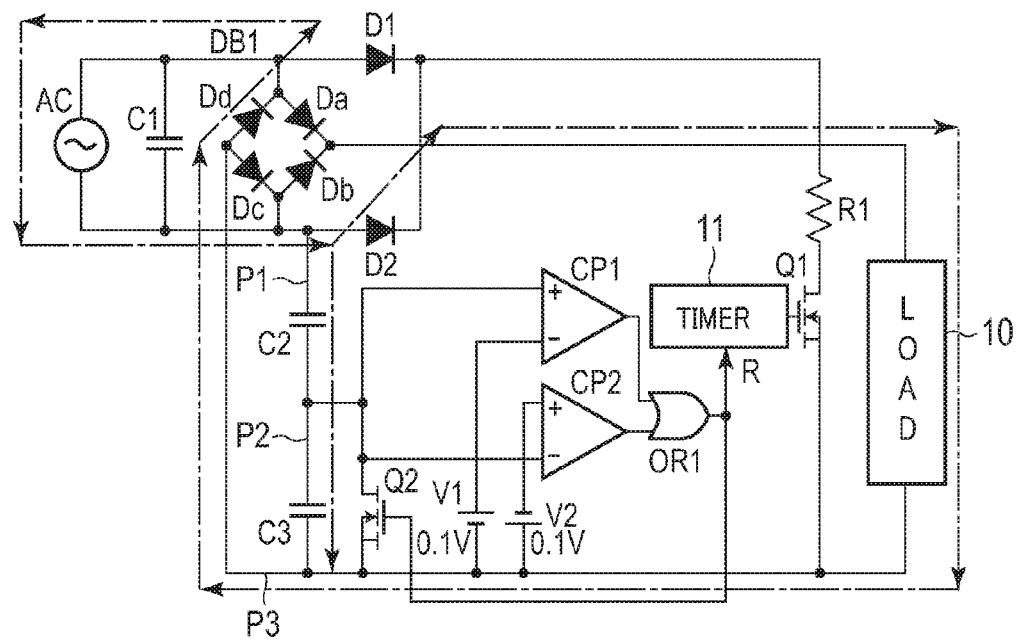
FIG. 2 is a diagram illustrating paths of current during charge in the capacitor discharge circuit.

First, operation during charge of capacitors C2 and C3 is described with reference to FIG. 2. During charge of capacitors C2 and C3, as illustrated in FIG. 2, current flows through a route of alternating-current power source AC→capacitor C2→capacitor C3→diode Dd→alternating-current power source AC to charge capacitors C2 and C3. Also, current flows through a route of alternating-current power source AC→diode Db→load 10→diode Dd→alternating-current power source AC.

Figure 3:
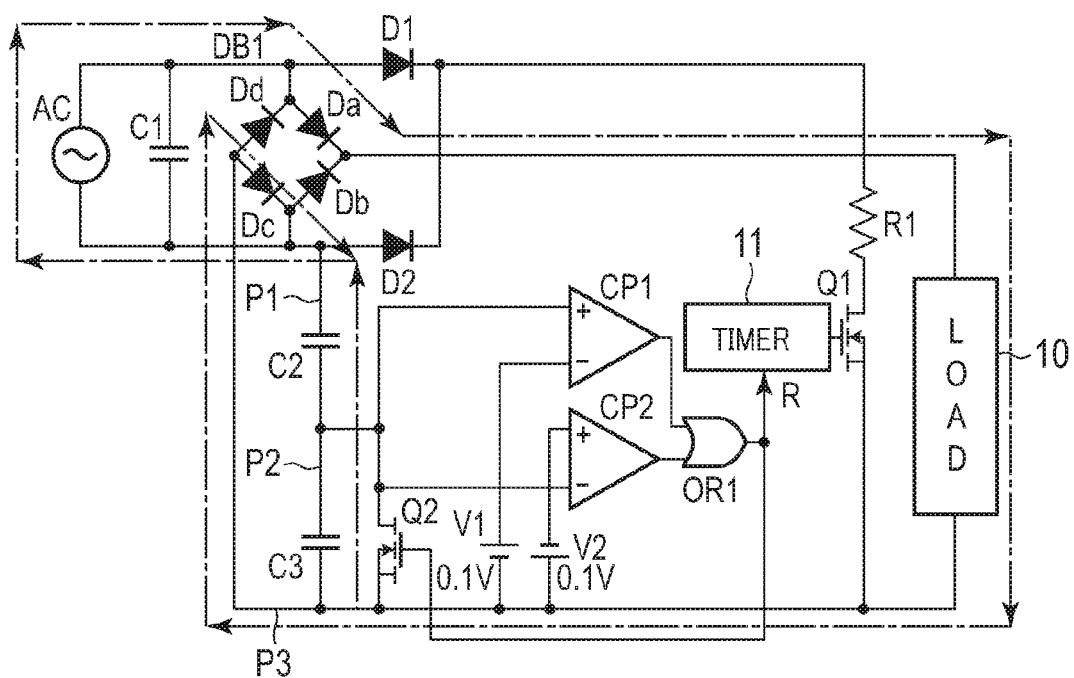
FIG. 3 is a diagram illustrating paths of current during discharge in the capacitor discharge circuit.

Next, operation during discharge of capacitors C2 and C3 is described with reference to FIG. 3. In this case, current flows through a route of alternating-current power source AC→diode Da→load 10→capacitors C3 and C2→alternating-current power source AC. Diode Dc is turned on when the discharge of capacitors C3 and C2 is completed.

Figure 4:
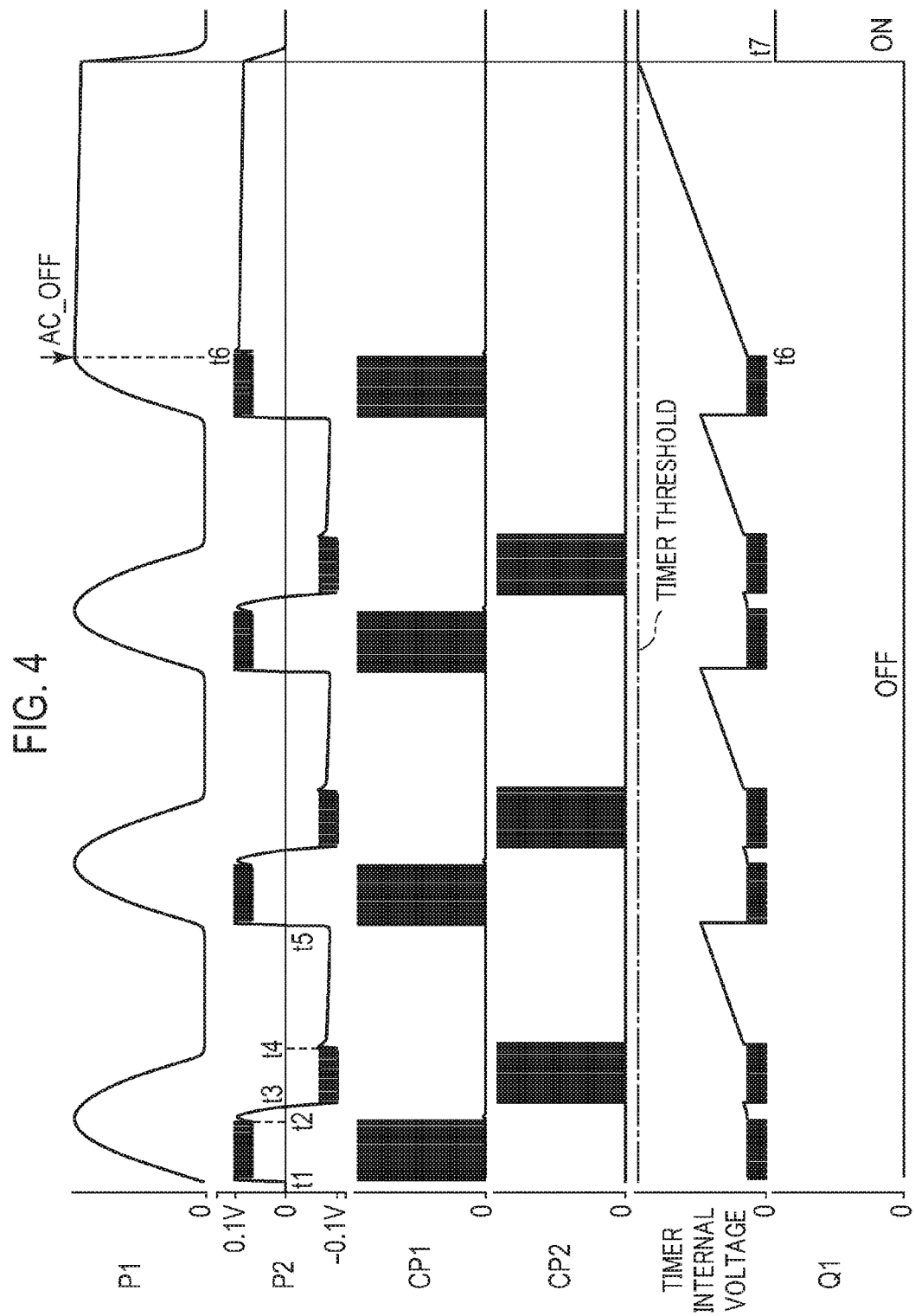
FIG. 4 is a timing chart illustrating an example of the waveforms of some elements in the capacitor discharge circuit.

Next, the operation of some elements is described with reference to the timing chart illustrated in FIG. 4. FIG. 4 illustrates P1 as the voltage of capacitor C2, P2 as the voltage of capacitor C3, CP1 as the output voltage of comparator CP1, CP2 as the output voltage of comparator CP2, the timer internal voltage, and Q1 as the ON-OFF output of switching element Q1.

First, as illustrated in FIG. 4, as the voltage of alternating-current power source AC rises, voltage P1 of capacitor C2 also rises in a half sinusoidal waveform from time t1 to time t2. Specifically, voltage P1 of capacitor C2 changes at +dV/dt from time t1 to time t2.

As voltage P1 of capacitor C2 changes at +dV/dt, voltage P2 of capacitor C3 also rises according to +dV/dt and the ratio in capacity between capacitor C2 and capacitor C3. Then, when voltage P2 exceeds the voltage of reference power source V1, which is 0.1 V, comparator CP1 outputs an H level to OR circuit OR1. As a result, OR circuit OR1 applies an H level to the gate of switching element Q2, so that switching element Q2 is turned on. Hence, the charges of capacitor C3 are discharged.

As voltage P1 further rises, capacitor C3 is charged. When voltage P2 exceeds the voltage of reference power source V1, which is 0.1 V, comparator CP1 outputs an H level to OR circuit OR1, so that switching element Q2 is turned on. As a result, the charges of capacitor C3 are discharged. Thus, from time t1 to time t2, capacitor C3 is repetitively charged and discharged, as illustrated in FIG. 4. Also, the output of comparator CP1 is a pulse signal repetitively switching between an H level and an L level. With the pulse signal through OR circuit OR1, the timer internal voltage of timer 11 is also a pulse signal.

Then, as illustrated in FIG. 4, as the voltage of alternating-current power source AC drops, voltage P1 of capacitor C2 also drops in a half sinusoidal waveform from time t3 to time t4. Specifically, voltage P1 of capacitor C2 changes at -dV/dt from time t3 to time t4.

As voltage P1 of capacitor C2 changes at -dV/dt, voltage P2 of capacitor C3 also drops according to -dV/dt and the ratio in capacity between capacitor C1 and capacitor C2. Then, when voltage P2 drops below the voltage of reference power source V2, which is -0.1 V, comparator CP2 outputs an H level to OR circuit OR1. As a result, OR circuit OR1 applies an H level to the gate of switching element Q2, so that switching element Q2 is turned on. Hence, the charges of capacitor C3 are discharged.

As voltage P1 further drops, capacitor C3 is discharged. When voltage P2 drops below the voltage of reference power source V2, which is -0.1 V, comparator CP2 outputs an H level, so that switching element Q2 is turned on. As a result, the charges of capacitor C3 are discharged. Thus, from time t3 to time t4, capacitor C3 is repetitively charged and discharged, as illustrated in FIG. 4. Also, the output of comparator CP2 is a pulse signal repetitively switching between an H level and an L level. With the pulse signal through OR circuit OR1, the timer internal voltage of timer 11 is also a pulse signal.

Then, from time t4 to time t5, when voltage P1 of capacitor C2 reaches 0, comparator CP1 outputs an L level to OR circuit OR1. As a result, timer 11 raises the timer internal voltage from time t4 to time t5. At time t5, voltage P1 rises as it does at time t1. Thus, the subsequent operation is the same as the operation from time t1 to time t4.

Thereafter, when alternating-current power source AC is turned off, that is, the plug is pulled out at time t6, voltage P1 of capacitor C2 is maintained. In this period, voltage P2 of capacitor C3 is near 0.1 V, and OR circuit OR1 therefore outputs an L level to timer 11.

Thus, timer 11 raises the timer internal voltage from time t6 to time t7. At time t7, the timer internal voltage reaches the timer threshold, and timer 11 therefore outputs an ON signal to the gate of switching element Q1.

As a result, at time t7, switching element Q1 is turned on, so that current flows through a route of capacitor C1→diode D1→discharge resistor R1→switching element Q1→diode Dc→capacitor C1. In this way, the charges of capacitor C1 are discharged, thereby preventing the user from getting an electric shock by touching the plug.

In the capacitor discharge circuit described in Japanese Patent No. 4446136, the series circuit with the first capacitor and the second capacitor, connected between the alternating-current power lines, have a relatively large capacity, and three or more configurations are needed for the series circuit, time-constant circuits, and capacitors combined with each other. Hence, it is impossible to reduce the size of the capacitor discharge circuit.

Also, in related techniques, the voltage of a commercial power source may be divided using resistors to perform alternating-current voltage detection. However, a resistive loss occurs, making it impossible to reduce the standby power. Also, in the case of performing alternating-current voltage detection using resistors, the resistors need to have high resistance, which requires ingenious ideas in terms of processing, and increases the size of the actual mount area for the resistors.

In contrast, in the capacitor discharge circuit illustrated in FIG. 1, two voltage-detection capacitors C2 and C3 are used to detect alternating-current voltage, which makes the capacitor discharge circuit simple. Thus, the size of the capacitor discharge circuit can be reduced. It is therefore easy to incorporate the capacitor discharge circuit into an integrated circuit (IC).

Moreover, by using two voltage-detection capacitors C2 and C3 to detect alternating-current voltage, there is no loss due to detection resistors. Thus, the standby power is further reduced. In addition, detection resistors having high resistance are not needed. Thus, the chip area of the capacitor discharge circuit can be reduced as well.

Note that discharge resistor R1 is used as a discharge device, but the charges of capacitor C1 may be discharged through the activation circuit.

Embodiment 2

Figure 5:
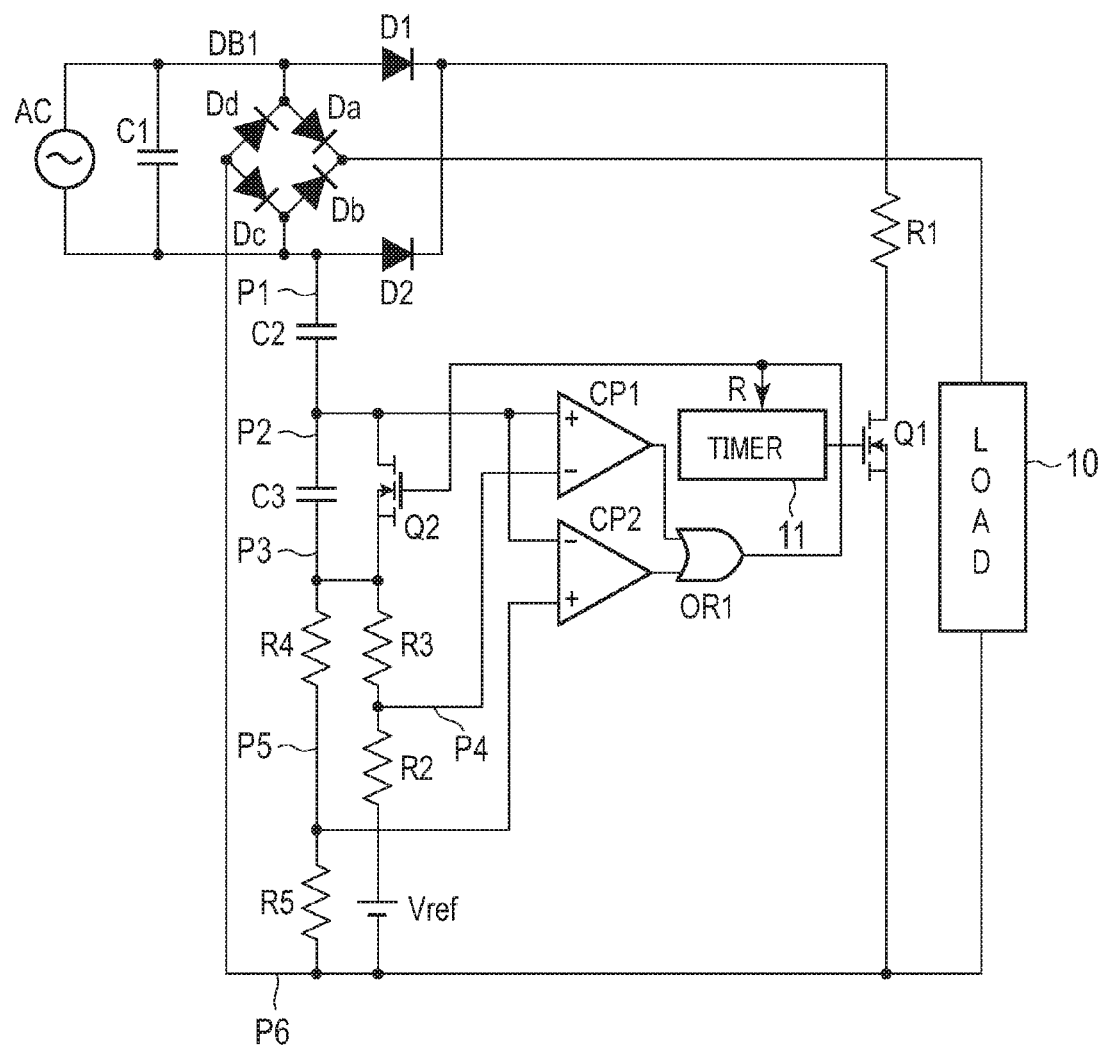
FIG. 5 is a diagram illustrating the circuit configuration of a capacitor discharge circuit according to one or more embodiments.

FIG. 5 is a diagram illustrating the circuit configuration of a capacitor discharge circuit according to one or more embodiments. The difference of the capacitor discharge circuit illustrated in FIG. 5 from the capacitor discharge circuit illustrated in FIG. 1 is the following configuration.

The capacitor discharge circuit illustrated in FIG. 5 includes resistors R2 to R5 and reference power source Vref in place of reference power source V1 and reference power source V2, illustrated in FIG. 1.

One end of resistor R4 (corresponding to a first resistor) is connected to the other end of capacitor C3, and one end of resistor R5 (corresponding to a second resistor) is connected to the other end of resistor R4. The other end of resistor R5 is connected to the anode of diode Dd and the anode of diode Dc.

One end of resistor R3 (corresponding to a third resistor) is connected to the source of switching element Q2, and the other end of resistor R3 is connected to one end of resistor R2 (corresponding to a fourth resistor). The other end of resistor R2 is connected to the positive electrode of reference power source Vref (corresponding to a reference power source), and the negative electrode of reference power source Vref is connected to the anode of diode Dd and the anode of diode Dc.

The non-inverting input terminal of comparator CP1 and the inverting input terminal of comparator CP2 are connected to the one end of capacitor C3 and the drain of switching element Q2. The inverting input terminal of comparator CP1 is connected to the other end of resistor R3 and the one end of resistor R2. The non-inverting input terminal of comparator CP2 is connected to the other end of resistor R4 and the one end of resistor R5.

Note that the voltage at the node between resistor R4 and capacitor C3 is P3, the voltage at the node between resistor R2 and resistor R3 is P4, and the voltage at the node between resistor R5 and resistor R4 is P5.

Figure 6:
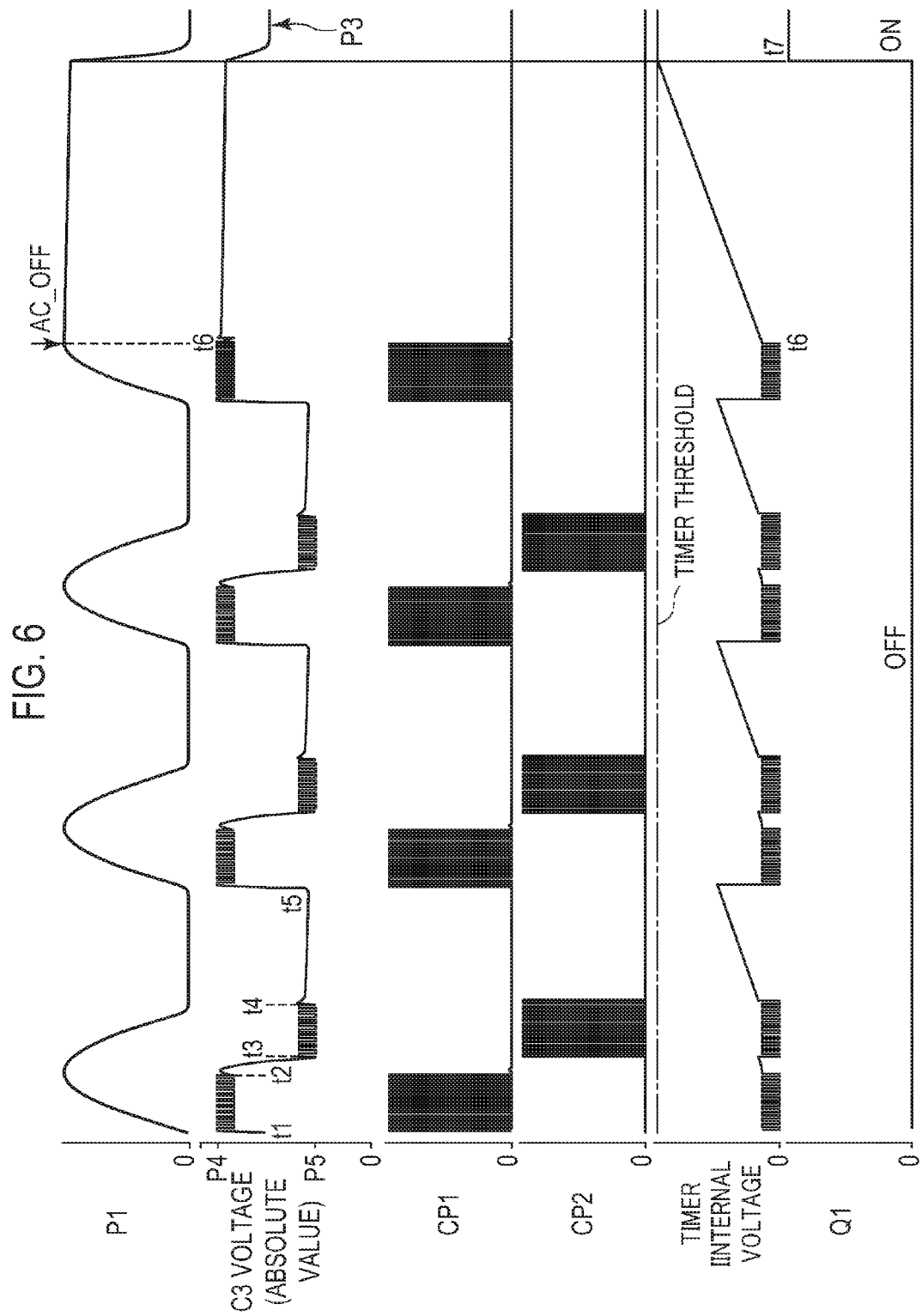
FIG. 6 is a timing chart illustrating an example of the waveforms of some elements in the capacitor discharge circuit.

FIG. 6 is a timing chart illustrating an example of the waveforms of some elements in the capacitor discharge circuit. P1, CP1, CP2, the timer internal voltage, and Q1 illustrated in FIG. 6 are the same as those illustrated in FIG. 4. In FIG. 4, voltage P2 of capacitor C3 changes in the range of the voltage of reference power source V2, which is −0.1 V, to the voltage of reference power source V1, which is +0.1 V.

In the capacitor discharge circuit, comparators CP1 and CP2, switching element Q2, and OR circuit OR1, which serve as a second discharge circuit, causes capacitor C3 to discharge such that the absolute value of the voltage across the opposite ends of capacitor C3 does not reach or exceed voltage P4 at the node between resistor R2 and resistor R3, or causes capacitor C3 to discharge such that the absolute value of the voltage across the opposite ends of capacitor C3 does not drop to or below voltage P5 at the node between resistor R4 and resistor R5.

In this case, voltage P4 at the node between resistor R2 and resistor R3 serves as the voltage of a reference power source for comparator CP1, and voltage P5 at the node between resistor R5 and resistor R4 serves as the voltage of a reference power source for comparator CP2. Thus, the absolute value of the voltage of capacitor C3 illustrated in FIG. 6 changes in the range of voltage P5 of resistor R5 to voltage P4 of resistor R2.

The other features of the operation of the capacitor discharge circuit according to embodiment 2 are similar to the operation of the capacitor discharge circuit according to embodiment 1, and their description is therefore omitted. Also, the capacitor discharge circuit according to embodiment 2 achieves similar advantageous effects to those by the capacitor discharge circuit according to embodiment 1.

Embodiment 3

Figure 7:
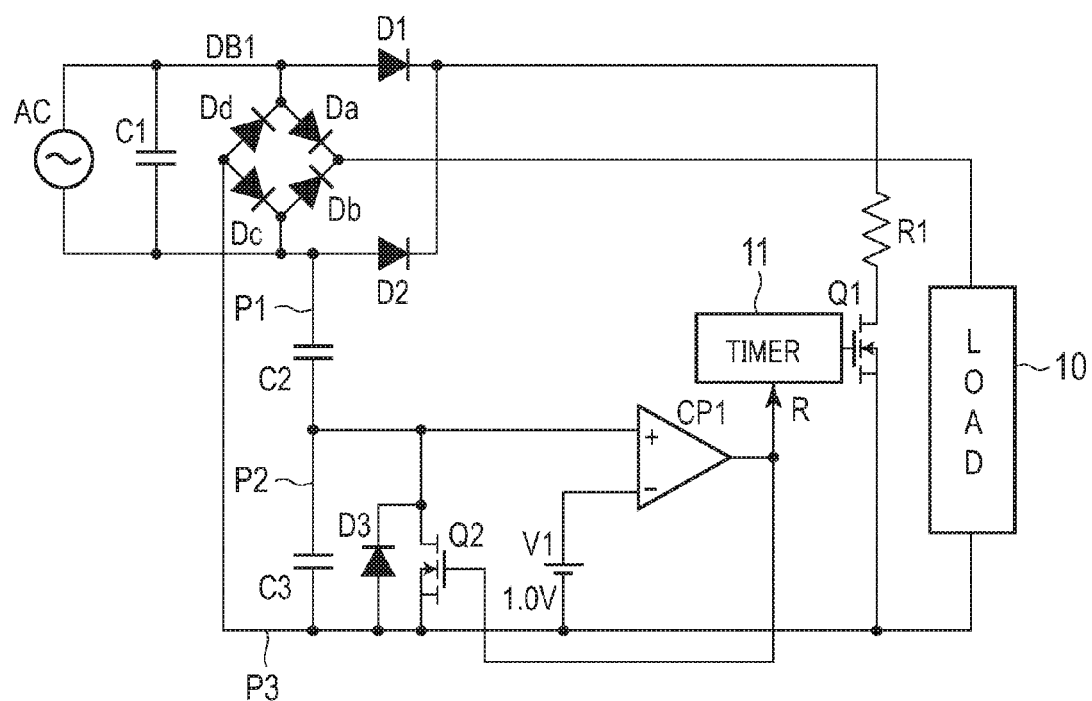
FIG. 7 is a diagram illustrating the circuit configuration of a capacitor discharge circuit according to one or more embodiments.

FIG. 7 is a diagram illustrating the circuit configuration of a capacitor discharge circuit according to one or more embodiments. The difference of the capacitor discharge circuit illustrated in FIG. 7 from the capacitor discharge circuit illustrated in FIG. 1 is the following configuration.

The capacitor discharge circuit includes diode D3 in place of comparator CP2, reference power source V2, and OR circuit OR1 illustrated in FIG. 1.

The output of comparator CP1 is connected to reset terminal R of timer 11. The cathode of diode D3 is connected to the drain of switching element Q2, and the anode is connected to the source. Reference power source V1 is changed to a voltage higher than forward voltage VF of diode D3, e.g. to a voltage of 1 V.

Figure 8:
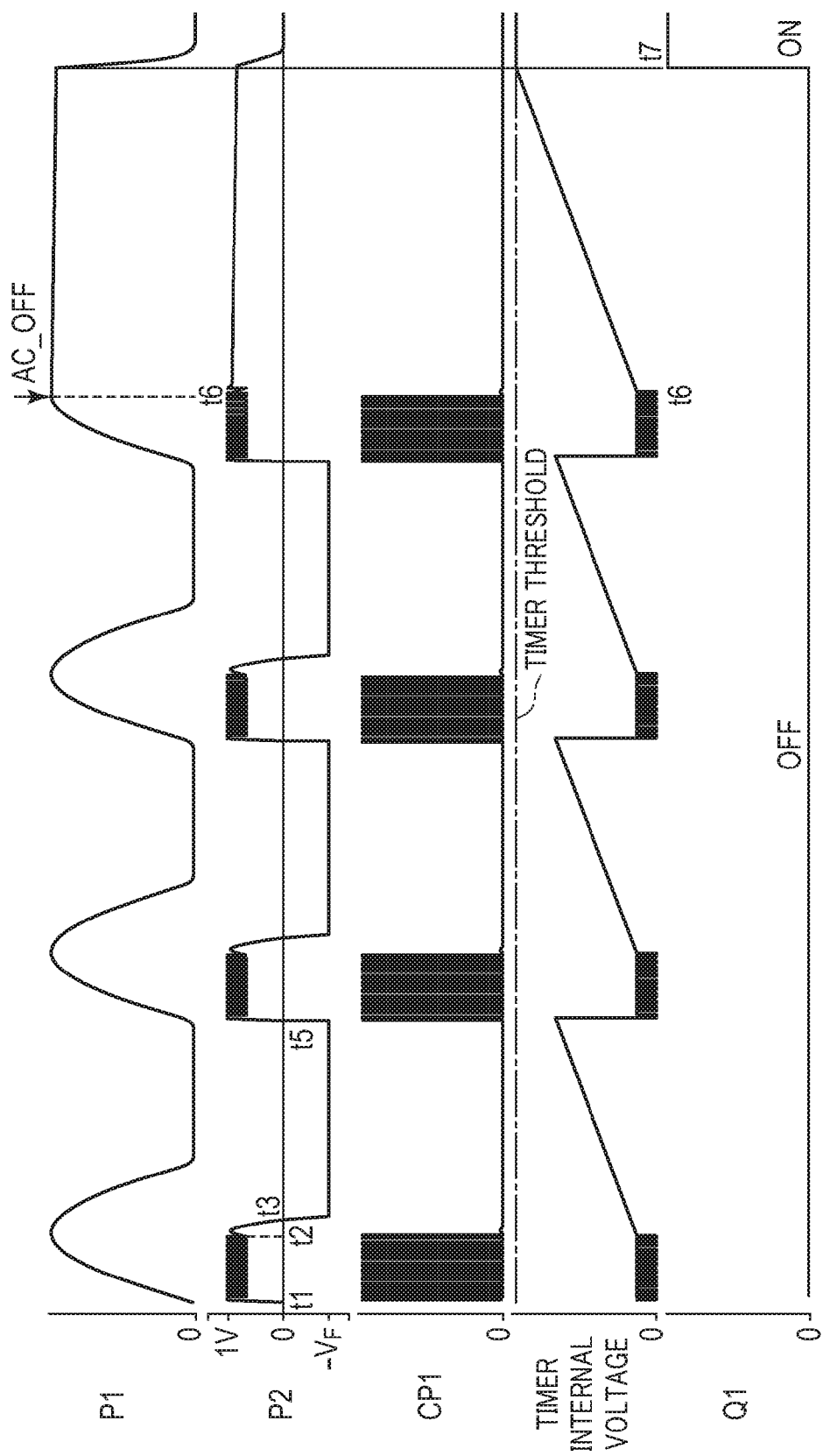
FIG. 8 is a timing chart illustrating an example of the waveforms of some elements in the capacitor discharge circuit.

FIG. 8 is a timing chart illustrating the waveforms of some elements in the capacitor discharge circuit. P1, CP1, the timer internal voltage, and Q1 illustrated in FIG. 8 are similar to those illustrated in FIG. 4. In FIG. 4, voltage P2 of capacitor C3 changes in the range of the voltage of reference power source V2, which is −0.1 V, to the voltage of reference power source V1, which is +0.1 V.

In the capacitor discharge circuit, comparator CP1 and switching element Q2, which serve as a second discharge circuit, cause capacitor C3 to discharge such that the positive value of the voltage across the opposite ends of capacitor C3 does not reach or exceed reference voltage V1. Also, the negative value of the voltage across the opposite ends of capacitor C3 is clamped at forward voltage $V_F$ of diode D3.

Specifically, in the capacitor discharge circuit, capacitor C3 is discharged by switching element Q2 only when voltage P1 of capacitor C2 is at +dV/dt during charge (only when voltage P1 rises). Accordingly, the timing when the timer internal voltage starts to rise shifts to an earlier point; the timer internal voltage rises from time t2 to t5. Hence, the time taken for timer 11 to reach the timer threshold is changed from the length of a half cycle of alternating-current power source AC or longer to the length of a ¾ cycle or longer.

Note that, by changing the timer threshold, the capacitor discharge circuit according to embodiment 3 can achieve similar advantageous effects to those by the capacitor discharge circuit according to embodiment 1.

Application of Embodiments

In an application of any of the above embodiments, a switching power supply device may be used as a load, and a control circuit for this switching power supply device may be configured as an integrated circuit with the capacitor discharge circuit of the invention incorporated in the control circuit.

Moreover, although above timer 11 is described as a time-constant circuit, it may be configured as a counter circuit instead of a time-constant circuit.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A capacitor discharge circuit comprising:
   a capacitor connected in parallel to an alternating-current power source;
   a rectification element that performs full-wave rectification on an alternating-current voltage from the alternating-current power source and supplies a rectified output to a load;
   a first discharge circuit that includes a first diode with an anode thereof connected to one end of the capacitor and a second diode with an anode thereof connected to another end of the capacitor, and causes the capacitor to discharge between cathodes of the first and second diodes and a ground terminal of the rectification element, the cathodes of the first and second diodes being connected to each other;
   a first series circuit including a first capacitor and a second capacitor connected in series between one end of the alternating-current power source and the ground terminal of the rectification element;
   a second discharge circuit that causes the second capacitor to discharge such that an absolute value of voltage across opposite ends of the second capacitor, which is connected to the ground terminal side of the rectification element, does not reach a predetermined voltage; and
   a predetermined period generator that actuates the first discharge circuit after an elapse of a predetermined period of time from stoppage of a discharge operation of the second discharge circuit.

2. The capacitor discharge circuit according to claim 1, wherein the predetermined period of time is longer than a half cycle of the alternating-current power source.

3. The capacitor discharge circuit according to claim 1, further comprising:
   a second series circuit including a first resistor and a second resistor connected in series between the second capacitor, which is connected to the ground terminal side of the rectification element, and the ground terminal of the rectification element; and
   a third series circuit including a third resistor, a fourth resistor, and a reference power source connected in series between the second capacitor and the ground terminal of the rectification element, a negative electrode of the reference power source being connected to the ground terminal of the rectification element,
   wherein the second discharge circuit causes the second capacitor to discharge such that the absolute value of voltage across the opposite ends of the second capacitor is greater than a voltage at a node between the first resistor and the second resistor, or causes the second capacitor to discharge such that the absolute value of voltage across the opposite ends of the second capacitor does not reach a voltage at a node between the third resistor and the fourth resistor.

4. The capacitor discharge circuit according to claim 1, wherein the first discharge circuit comprises:
   a discharge resistor connected to the cathodes of the first and second diodes; and
   a first switching element that is connected in series to the discharge resistor and is turned on by a signal from the predetermined period generator.

5. The capacitor discharge circuit according to claim 1, wherein
   the second discharge circuit causes the second capacitor to discharge only when voltage of the first capacitor rises, and
   the predetermined period of time is longer than a ¾ cycle of the alternating-current power source.

6. A capacitor discharge circuit comprising:
   an X capacitor connected in parallel to an alternating-current power source;
   a rectification element that performs full-wave rectification on an alternating-current voltage from the alternating-current power source and supplies a rectified output to a load;
   a first discharge circuit comprising:
      a first diode with an anode thereof connected to one end of the X capacitor;
      a second diode with an anode thereof connected to another end of the X capacitor, cathodes of the first and second diodes being connected to each other;
      a discharge resistor; and
      a first switching element, the discharge resistor and the first switching element being connected in series between the cathodes of the first and second diodes and the other end of the X capacitor,
   a first series circuit including a first capacitor and a second capacitor connected in series between one end of the alternating-current power source and a ground terminal of the rectification element;
   a second discharge circuit that includes a second switching element connected in parallel to the second capacitor and a reference power source having a predetermined voltage, and turns on the second switching element when an absolute value of voltage across opposite ends of the second capacitor is not equal to the predetermined voltage of the reference power source; and
   an activation circuit that comprises a timer and turns on the first switching element when a period of time during which the absolute value of voltage across opposite ends of the second capacitor is equal to the predetermined voltage of the reference power source is longer than a predetermined period of time.

7. The capacitor discharge circuit according to claim 6, wherein the predetermined period of time is longer than a half cycle of the alternating-current power source.

* * * * *